US 6,948,741 B2
Sep. 27, 2005

(12) United States Patent
Manwaring et al.

(54) TELESCOPING STEERING COLUMN ASSEMBLY

(75) Inventors: Marvin V. Manwaring, Clio, MI (US); Ravindra Jwalapathy, Saginaw, MI (US); Melvin L. Tinnin, Clio, MI (US); Ray G. Armstrong, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 46 days.

(21) Appl. No.: 10/428,535

(22) Filed: May 2, 2003

(65) Prior Publication Data

US 2003/0209897 A1 Nov. 13, 2003

Related U.S. Application Data

(60) Provisional application No. 60/379,654, filed on May 9, 2002.

(51) Int. Cl.[7] .................................................. B62D 1/18
(52) U.S. Cl. ........................ 280/775; 280/776; 280/779; 74/493
(58) Field of Search ............................... 280/774, 775, 280/776, 779; 74/493

(56) References Cited

U.S. PATENT DOCUMENTS

| | | | | |
|---|---|---|---|---|
| 5,199,319 A | * | 4/1993 | Fujiu | ............................ 74/493 |
| 5,287,763 A | | 2/1994 | Nagashima | |
| 5,520,416 A | | 5/1996 | Singer, III et al. | |
| 5,743,150 A | * | 4/1998 | Fevre et al. | ................... 74/493 |
| 5,845,936 A | * | 12/1998 | Higashino | .................... 280/775 |
| 5,911,789 A | * | 6/1999 | Keipert et al. | ................. 74/493 |
| 5,921,577 A | | 7/1999 | Weiss et al. | |
| 6,036,228 A | | 3/2000 | Olgren et al. | |
| 6,189,405 B1 | * | 2/2001 | Yazane | ......................... 74/493 |
| 6,189,929 B1 | | 2/2001 | Struble et al. | |
| 6,244,128 B1 | * | 6/2001 | Spencer et al. | ................ 74/493 |
| 6,279,951 B1 | * | 8/2001 | Cartwright et al. | .......... 280/775 |
| 6,322,103 B1 | | 11/2001 | Li et al. | |
| 6,364,357 B1 | | 4/2002 | Jurik et al. | |
| 6,419,269 B1 | | 7/2002 | Manwaring et al. | |
| 6,435,555 B1 | | 8/2002 | Seamon et al. | |
| 6,450,532 B1 | | 9/2002 | Ryne et al. | |
| 6,467,807 B2 | * | 10/2002 | Ikeda et al. | .................. 280/775 |
| 6,543,807 B2 | | 4/2003 | Fujiu et al. | |
| 6,616,185 B2 | | 9/2003 | Manwaring et al. | |
| 6,623,036 B2 | * | 9/2003 | Yamamura et al. | .......... 280/775 |

* cited by examiner

*Primary Examiner*—Paul N. Dickson
*Assistant Examiner*—Toan To
(74) *Attorney, Agent, or Firm*—Michael D. Smith

(57) ABSTRACT

The telescoping steering column includes a fixed jacket, and telescoping a translating jacket, and an inner tubular member. A wedge, is moved by a screw, into wedging engagement with the inner tubular member to force the inner tubular member into engagement with the translating jacket and the translating jacket into the fixed jacket for preventing relative longitudinal movement.

11 Claims, 3 Drawing Sheets

TELESCOPING STEERING COLUMN ASSEMBLY

This application claims the benefit of U.S. Provisional Application No. 60/379,654, filed May 9, 2002.

BACKGROUND OF THE INVENTION

1. Field of the Invention

The subject invention relates to a vehicle steering column, and more particularly to a mechanism for adjusting a height position of a steering wheel connected to the vehicle steering column to accommodate the position of a driver.

2. Description of the Prior Art

Generally, a variety of tilting and telescoping steering column arrangements have been developed and are used today in the field of automotive industry. Telescoping steering column assembly typically uses two jackets, wherein one jacket is fixed to a frame of a vehicle body, and another jacket is adapted to be translated with respect to the jacket fixed to the frame, thereby providing relative longitudinal movement between the two jackets with respect to one another.

Various configurations and designs are available in the prior art for telescoping steering column assemblies and have been disclosed in U.S. Pat. No. 5,287,763 to Nagashima, U.S. Pat. No. 5,520,416 to Singer, III et al., U.S. Pat. No. 5,921,577 to Weiss et al., U.S. Pat. No. 6,036,228 to Olgren et al., U.S. Pat. No. 6,364,357 to Jurik et al., U.S. Pat. No. 6,450,532 to Ryne et al., and U.S. Pat. No. 6,543,807 to Fujiu et al.

Although the prior art configurations of the telescoping steering column assembly are used in the automotive industry today, there remains an opportunity for a new design for adjusting the relative longitudinal position between two jackets of a steering column.

BRIEF SUMMARY OF INVENTION

A telescoping steering column assembly of the present invention includes a fixed jacket, a translating jacket disposed in telescoping relationship within the fixed jacket, and an inner tubular member disposed in telescoping relationship within the translating jacket. A wedge reacts with the fixed jacket and is movable transversely of the fixed jacket and the translating jacket for forcing the inner tubular member into engagement with the translating jacket and the translating jacket into the fixed jacket for preventing relative longitudinal movement between the fixed jacket and the translating jacket and the inner tubular member.

Accordingly, the telescoping steering column of the present invention is new, efficient, and provides for an effective way for preventing the relative longitudinal movement between the fixed jacket, the translating jacket, and the inner tubular member.

Another advantage of the present invention is to provide an economical and positive reduction of both lash and friction between the translating jacket and the fixed jacket, thereby improving the telescoping effect.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
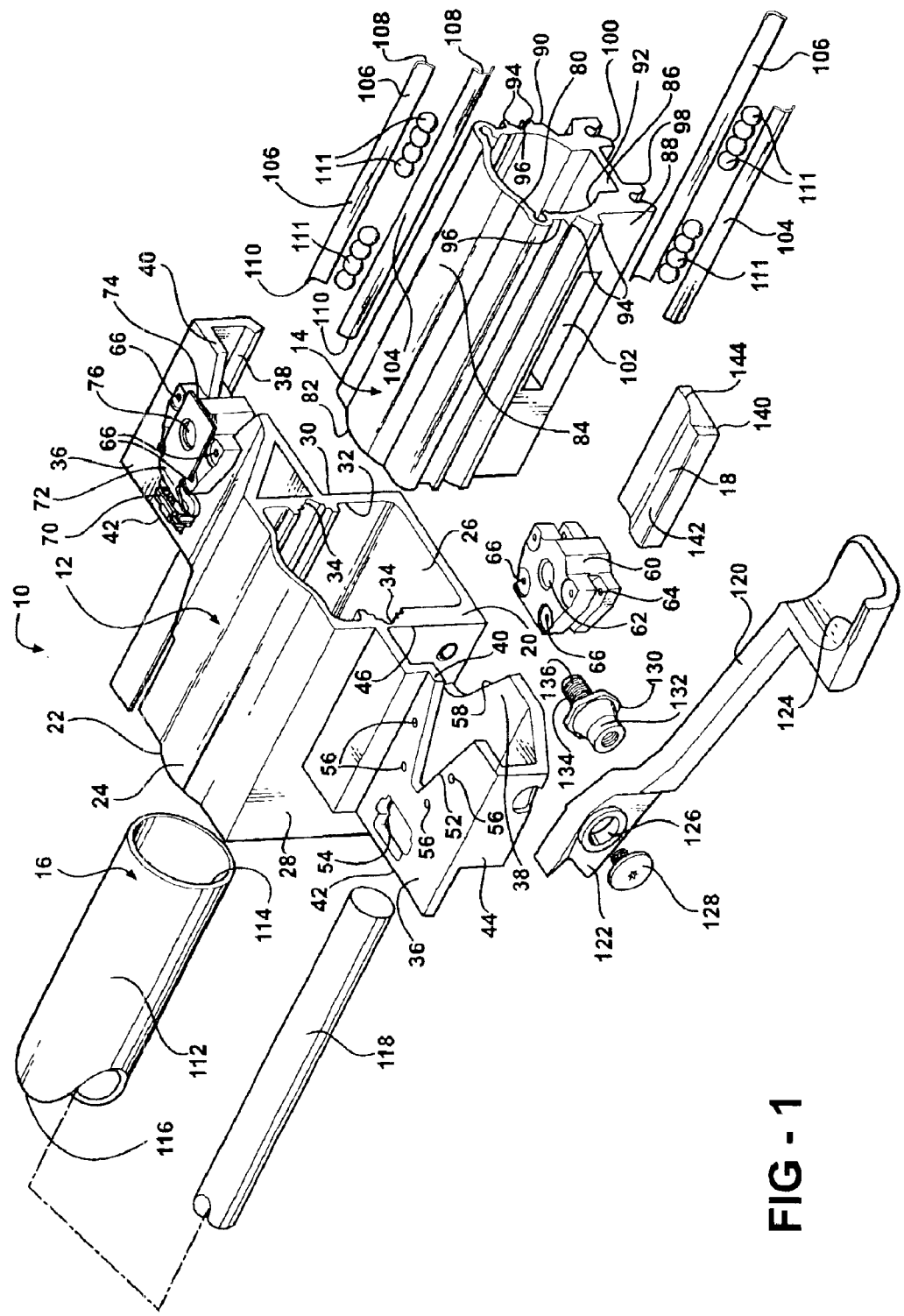
FIG. 1 is an exploded view of a telescoping steering column assembly.
Figure 2:
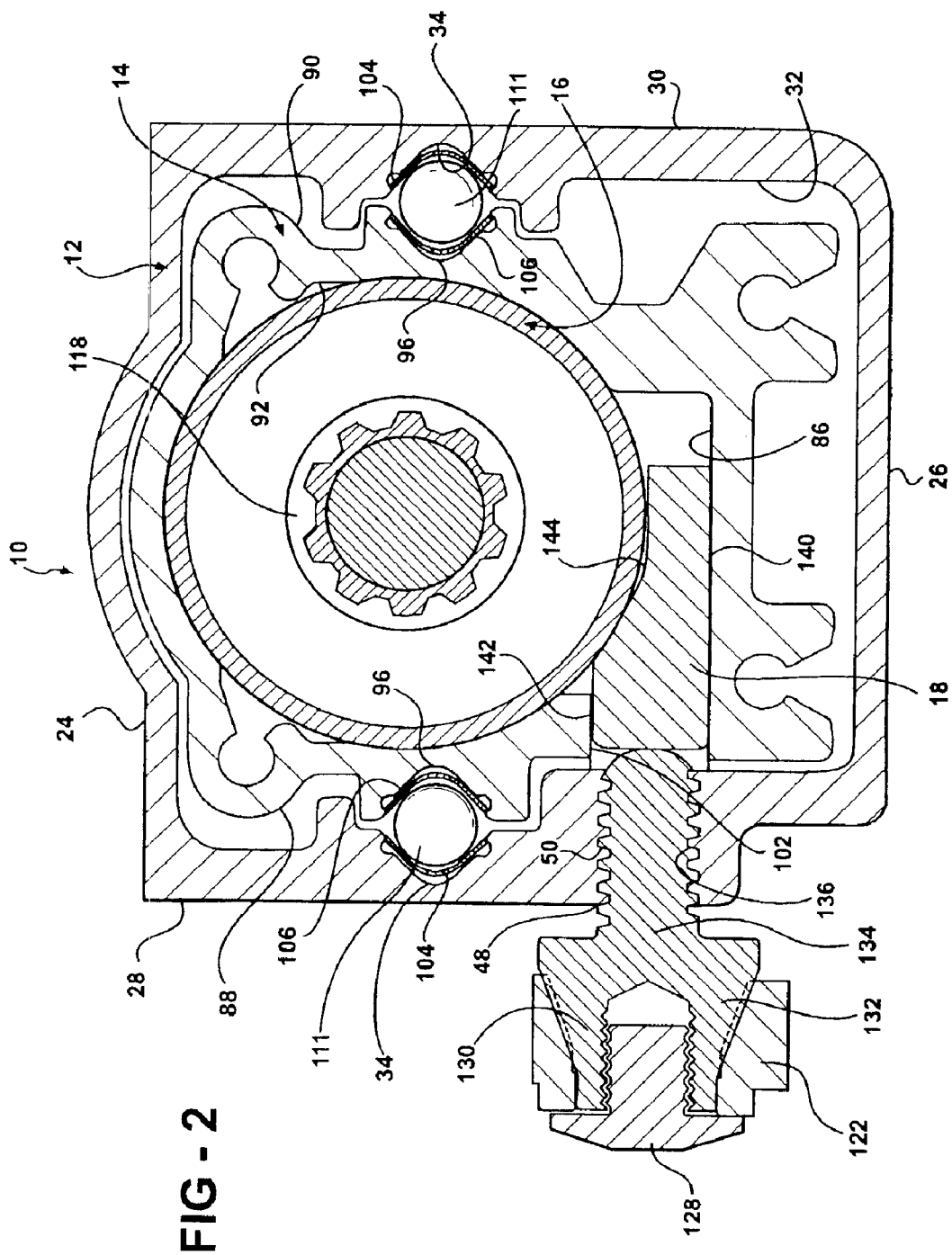
FIG. 2 is a cross sectional view of the telescoping steering column assembly.
Figure 4:
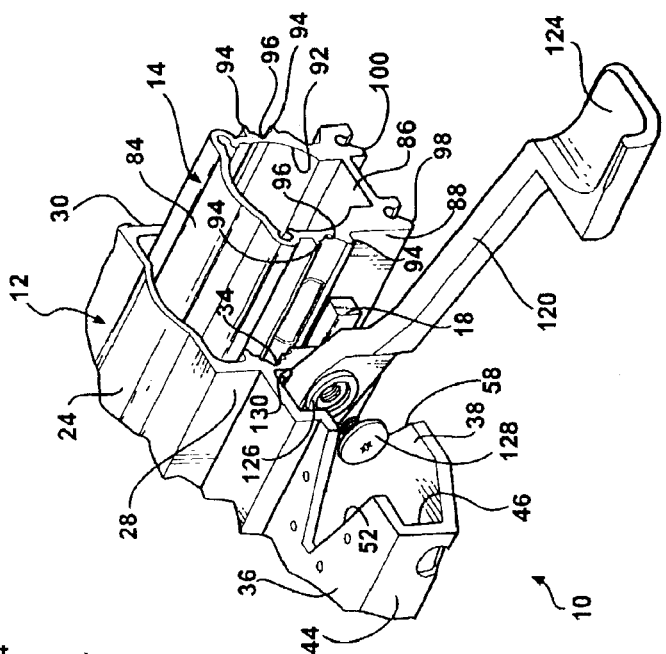
FIG. 4 is a perspective view of the telescoping steering column assembly shown in FIG. 3 having a tilt lever pivotably attached to one of side walls of the fixed jacket.
Figure 3:
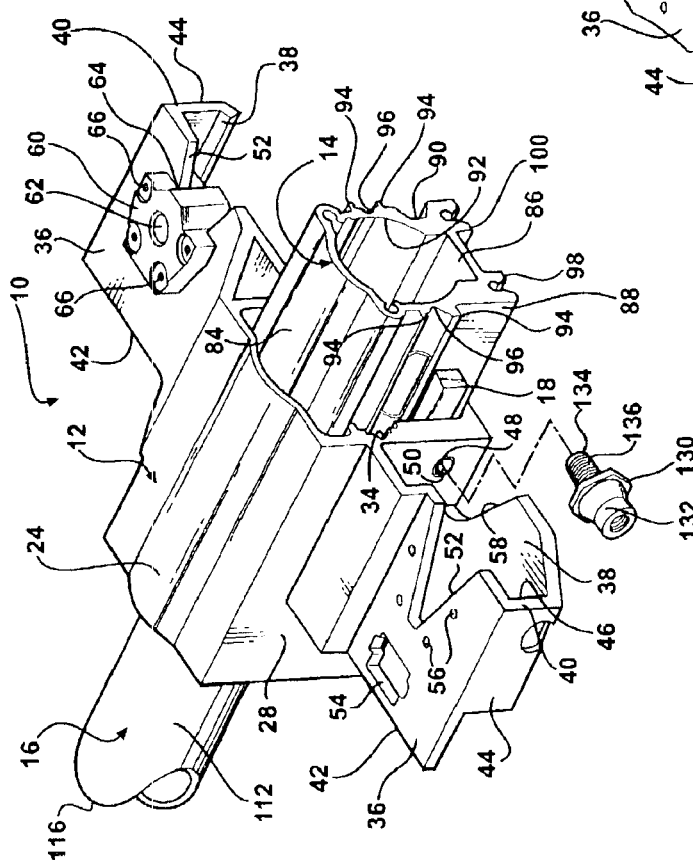
FIG. 3 is a perspective view of the telescoping steering column assembly having a translating jacket disposed in telescoping relationship within a fixed jacket.

Referring to the FIGS. 1 through 4, wherein like numerals indicate like or corresponding parts throughout the several views, a telescoping steering column assembly is generally shown at 10. The telescoping steering column assembly 10 includes a fixed jacket, generally indicated at 12, a translating jacket, generally indicated at 14, disposed in telescoping relationship within the fixed jacket 12, and an inner tubular member, generally indicated at 16, disposed in telescoping relationship within the translating jacket 14. The telescoping steering column assembly 10 further includes a wedge 18 reacting with the fixed jacket 12 and movable transversely of the fixed jacket 12 and the translating jacket 14 for forcing the inner tubular member 16 into engagement with the translating jacket 14 and the translating jacket 14 into the fixed jacket 12 for preventing relative longitudinal movement between the fixed jacket 12 and the translating jacket 14 and the inner tubular member 16.

The fixed jacket 12 includes first 20 and second 22 ends, top 24, bottom 26, and side walls 28, 30 further defining a housing 32. Each of the side walls 28, 30 of the fixed jacket 12 include at least one groove 34 extending between the first 20 and second 22 ends of the fixed jacket 12. The side walls 28, 30 include a top flange 36 and a bottom flange 38 having first 40 and second 42 ends adjacent and spaced from one another. The top 36 and bottom 38 flanges extend outwardly and horizontally from each of the side walls 28, 30. The top 36 and bottom 38 flanges are interconnected with a wall 44 to define an aperture 46 therebetween. One of the side walls 28 further defines a hole 48 located between the top flange 36 and the bottom flange 38, wherein the hole 48 includes a male thread connector 50.

The top flange 36 of the tubular fixed housing 12 includes a V shaped slot 52 having an edge at the first end 40 and a rectangular aperture 54 at the second end 42 of the top flange 36. The top flange 36 further defines at least one hole 56 around a contour of the V shaped slot 52. The bottom flange 38 includes a U shaped slot 58 having an edge at the first end 40 of the bottom flange 38.

The fixed jacket 12 includes a release capsule 60 having a bore 62 and a side channel 64 extending around the release capsule 60. The release capsule 60 includes a plurality of holes 66 located around the bore 62 and aligned with the holes 56 around the contour of the V shaped slot 52 of the top flange 36 to receive fasteners (not shown) thereby securing the release capsule 60 to the top flange 36. The side channel 64 is designed to engage the edge of the V shaped slot 52 perpendicular to the top flange 36. The fixed jacket 12 includes a guide member 70 positioned within the rectangular aperture 54 to secure an energy absorbing strap 72 having first 74 and second end (not shown). The energy adsorbing strap 72 further includes a perforation 76 at the first end 74 aligned with the bore 62 of the release capsule 60. This release mechanism is described in the aforementioned U.S. Pat. No. 6,450,532.

In one embodiment of the present invention the fixed jacket 12 is formed from a polymer by extruding the polymer through injection molding. As appreciated by those skilled in the art, the fixed jacket 12 may be form from a metal.

The translating jacket 14 includes first 80 and second 82 ends, top 84, bottom 86 and side walls 88, 90, defining a second housing 92 of a generally circular shape. Each of the side walls 88, 90 of the translating jacket 14 further define at least one ridge 94 integral with each of the side walls 88, 90 of the translating jacket 14. The ridges 94 extend outwardly and perpendicularly therefrom between the first 80 and second 82 ends of the translating jacket 14. The ridges 94 define a track 96 therebetween. The translating jacket 14 includes supports 98, 100 integral with and extending downwardly from the side walls 88, 90 of the translating jacket 14 adjacent the bottom wall 26 of the fixed jacket 12. The translating jacket 14 further includes an elongated slot 102 extending longitudinally of said first end 80 and second end 82 of the translating jacket 14 for receiving the wedge 18. The wedge 18 is slidably disposed in the elongated slot 102 for forcing the inner tubular member 16 into engagement with the translating jacket 14 and the translating jacket 14 into the fixed jacket 12 and for preventing relative longitudinal movement between the fixed jacket 12, the translating jacket 14, and the inner tubular member 16. In one embodiment of the present invention the translating jacket 14 is formed by extruding a polymer. The elongated slot 102 and the wedge are of about equal length to prevent longitudinal movement by the wedge 18.

The telescoping steering column assembly 10 includes a pair of races 104, 106 having first 108 and second 110 terminal ends, wherein one of the races 104 is mechanically connected to each of the grooves 34 extending between the first 20 and second 22 ends of the fixed jacket 12. Another race 106 is connected to the track 96 defined between the ridges 94 extending between the first 80 and second 82 ends of the translating jacket 14. The races 104, 106 have a V shaped configuration and are formed from a metal. The telescoping steering column assembly 10 further includes a plurality of bearing 112, confined between the races 104, 106 to provide for loose travel of the translating housing 14 within the fixed jacket 12. Similar to the races 104, 106, the bearings 112 are formed from a metal.

The telescoping steering column assembly 10 includes the inner tubular member 16 having a circular or cylindrical side wall 112, first 114 and second 116 ends. The inner tubular member 16 is disposed within the second housing 92 of the translating jacket 14. Similar to the translating jacket 14 and the fixed jacket 12, the inner tubular member 16 is formed from a polymer by extrusion. The inner tubular member 16 is designed to receive and to hold a steering column shaft 118 positioned therewithin.

The telescoping steering column assembly 10 includes a release lever 120 having a shoulder 122 at one terminal end and a plate 124 at another terminal end. The shoulder 122 includes a shoulder perforation 126 to receive a cap 128. The release lever 120 is positioned between in the aperture 46 defined between the top 36 and bottom 38 flanges of the fixed jacket 12. With respect to different modes of operation, the release lever 120 extends beyond the bottom flange 38 of the fixed jacket 12. The release lever 120 is pivotably connected to the side wall 28 of the fixed jacket 12 by a screw 130. The screw 130 includes a top portion 132 and a body 134 integral with the top portion 132. The top portion 132 of the screw 130 is engaged within the shoulder perforation 126 and is secured by the cap 128. The body 134 of the screw 130 extends through the hole 48 defined within the side wall 28 between the top flange 36 and the bottom flange 38. The body 134 of the screw 130 further defines a female thread connectors 136 to engage mechanically with the male thread connectors 50 of the hole 48.

The wedge 18 has a bottom surface 140 and top surface 142, wherein the top surface 142 includes a recess 144 complementary to the side wall 112 of the inner tubular member 16. The wedge 18 is positioned between the side wall 28 of said fixed jacket 12 and the side wall 88 of the translating jacket 14 extending through the elongated slot 102 from the first end 80 to the second end 82 of the translating jacket 14, wherein the wedge 18 abuts the body 134 of the screw 130.

In operation, as the release lever 120 is pushed downwardly, the body 134 of the screw 130 abuts and moves the wedge 18 transversely with respect to the fixed jacket 12 and the translating jacket 14 thereby forcing the inner tubular member 16 into engagement with the translating jacket 14 into the fixed jacket 12 for preventing relative longitudinal movement between the fixed jacket 12, the translating jacket 14, and the inner tubular member 16. When the release lever 120 is pushed upwardly, the body 134 of the screw 130 retracts outwardly within the hole 48 thereby releasing the wedge 18 within the elongated slot 102, allowing relative longitudinal movement between the fixed jacket 12, the translating jacket 14, and the inner tubular member 16, with respect to one another to adjust the position of a steering wheel (not shown) connected to the telescoping steering column assembly 10 to accommodate the position of a driver.

Obviously, many modifications and variations of the present invention are possible in light of the above teachings. The invention may be practiced otherwise than as specifically described within the scope of the appended claims. These antecedent recitations should be interpreted to cover any combination in which the incentive novelty exercises its utility.

What is claimed is:

1. A telescoping steering column assembly comprising;

a fixed jacket, a translating jacket disposed in telescoping relationship within said fixed jacket, an inner tubular member disposed in telescoping relationship within said translating jacket, a wedge reacting with said fixed jacket and movable transversely of said fixed jacket and said translating jacket for forcing said inner tubular member into engagement with said translating jacket and said translating jacket into said fixed jacket for preventing relative longitudinal movement between said fixed jacket and said translating jacket and said inner tubular member.

2. An assembly as set forth in claim 1 including a screw in threaded engagement with said fixed jacket and abutting said wedge for moving said wedge.

3. An assembly as set forth in claim 2 wherein said translating jacket includes first and second ends and side walls.

4. An assembly as set forth in claim 3 wherein said side wall of said translating jacket includes an elongated slot extending longitudinally of said first end and said second end of said translating jacket for receiving said wedge.

5. An assembly as set forth in claim 4 wherein said elongated slot supports said wedge substantially against movement of said wedge longitudinally of said translating jacket.

6. An assembly as set forth in claim 5 wherein said fixed jacket includes first and second ends and side walls defining a hole to receive said screw.

7. An assembly as set forth in claim 6 including a plurality of bearings disposed between said translating jacket and said fixed jacket for facilitating telescoping movement therebetween.

8. An assembly as set forth in claim 7 including a pair of races interconnecting said bearings.

9. An assembly as set forth in claim 5 wherein said wedge includes a recess complementary to said inner tubular member.

10. An assembly as set forth in claim 7 including a lever attached to said screw for rotating said screw within said hole.

11. An assembly as set forth in claim 7 wherein said side walls of said fixed jacket include a pair of grooves extending between said first and second ends of said fixed jacket of said bearings disposed in said grooves.

\* \* \* \* \*